United States Patent
Kawashima et al.

[11] Patent Number: 4,966,821
[45] Date of Patent: Oct. 30, 1990

[54] PERPENDICULAR MAGNETIC RECORDING MEDIUM

[75] Inventors: Ikue Kawashima; Futoyoshi Koh; Masafumi Kumano; Shinei Ryu, all of Sendai, Japan

[73] Assignees: Ricoh Company, Ltd., Tokyo; Ricoh Research Institute of General Electronics Co., Ltd., Miyagi, both of Japan

[21] Appl. No.: 372,307

[22] Filed: Jun. 27, 1989

Related U.S. Application Data

[63] Continuation-in-part of Ser. No. 73,461, Jul. 15, 1987, abandoned.

[30] Foreign Application Priority Data

Jul. 17, 1986 [JP] Japan .................. 61-168915
Mar. 26, 1987 [JP] Japan .................. 62-73762

[51] Int. Cl.$^5$ ............................................. G11B 23/00
[52] U.S. Cl. ................................... 428/694; 428/611; 428/900
[58] Field of Search ............... 428/694, 900, 928, 678, 428/681, 611

[56] References Cited

U.S. PATENT DOCUMENTS

| | | | |
|---|---|---|---|
| 4,210,946 | 7/1980 | Iwasaki et al. | 428/900 |
| 4,277,809 | 7/1981 | Fisher et al. | 428/900 |
| 4,513,054 | 4/1985 | Kitamoto et al. | 428/900 |
| 4,544,591 | 10/1985 | Uesaka et al. | 428/900 |
| 4,621,030 | 11/1986 | Uesaka | 428/611 |
| 4,624,894 | 11/1986 | Kishimoto | 428/900 |

FOREIGN PATENT DOCUMENTS 179942 11/1982 Japan.

Primary Examiner—Paul J. Thibodeau
Attorney, Agent, or Firm—Cooper & Dunham

[57] ABSTRACT

A perpendicular magnetic recording medium is disclosed, which comprises a substrate, a soft magnetic layer formed on the substrate, a lower recording layer having a coercive force of Hcl formed on the soft magnetic layer, and an upper recording layer having a coercive force of Hcu, with the coercive ratio of Hcu/Hcl being in the range of 1.4 to 3.3, that is, $1.4 \leq Hcu/Hcl \leq 3.3$.

2 Claims, 3 Drawing Sheets

PERPENDICULAR MAGNETIC RECORDING MEDIUM

This application is a continuation-in-part of copending application Ser. No. 07/073,461 filed July 15, 1987, now abandoned.

BACKGROUND OF THE INVENTION

The present invention relates to a perpendicular magnetic recording medium and more particularly to a double-layered perpendicular recording medium comprising a substrate, a soft magnetic layer having high permeability formed on the substrate, and a pair of recording layers formed on the soft magnetic layer which are different in coercive force. This recording medium is suitable for use in a perpendicular magnetizing recording and reproduction system.

Conventionally varieties of perpendicular magnetic recording media have been proposed. For example, a perpendicular magnetic recording medium comprising a substrate, a soft magnetic layer formed on the substrate, and a single recording layer formed on the soft magnetic layer is disclosed in U.S. Pat. No. 4,210,946; a perpendicular magnetic recording medium comprising a substrate, and a recording layer formed thereon consisting of two layers having different coercive forces in U.S. Pat. No. 4,624,894; and a perpendicular recording media comprising a substrate and a recording layer whose coercive force continuously changes in the direction of the depth thereof in Japanese Laid-Open Patent Application No. 57-179942.

One of the key features of the perpendicular magnetic recording media is that they can attain much higher recording density than the conventional longitudinal magnetic recording media. Because of this feature of the perpendicular magnetic recording media, when information is recorded in the perpendicular magnetic recording media by a magnetic head, it is required that recording be carried out with higher recording frequency than in the case of the longitudinal magnetic recording media. Furthermore when recording is performed in such magnetic recording media by use of a magnetic head, the magnetic head is magnetized by a coil wound around the head with electric current caused to flow through the coil, and a magnetic field is applied to the recording media by the magnetized head. Therefore, the higher the recording frequency, the higher the impedance of the magnetic head, and accordingly the more limited the electric current that can be caused to flow through the magnetic head. For this reason, it is desired that high reproduction output will be obtained by small recording magnetomotive force.

The above-mentioned conventional perpendicular recording media, however, have the following shortcomings. More specifically, in the case of the perpendicular magnetic recording medium comprising a substrate, a soft magnetic layer formed on the substrate, and a single recording layer formed on the soft magnetic layer as disclosed in U.S. Pat. No. 4,210,946, the relationship between the coercive force of the recording layer and the reproduction output of the recording media is shown in FIG. 1a. As shown in FIG. 1a, as the coercive force of the recording layer is increased, the reproduction output of the recording medium also increases up to a certain value of coercive force. However, when the coercive force exceeds the certain value, the reproduction output decreases. This phenomenon may be explained as follows: By increasing the coercive force of the recording layer to a certain value, the reproduction output of the recording medium can be increased. This is because the effect of the demagnetizing field which works in the perpendicular direction of the recording medium can be reduced. However, when the coercive force of the recording medium is increased and exceeds a certain value, the coercive force of the medium itself is so high that the recording medium cannot be magnetized sufficiently for producing high reproduction output.

The magnetomotive force necessary for recording information in the recording medium increases in proportion to the increase in the coercive force of the recording medium as shown in FIG. 1b.

For example, when an output required for reproduction of recorded information, which will be simply referred to as the required reproduction output, is set as indicated by the broken line in FIG. 1a, and an allowable recording magnetomotive force is set as indicated by the broken line in FIG. 1b, the coercive force Hc required for obtaining the necessary reproduction output has to be in the range of Hc2 and Hc3, that is, $Hc2 \leq Hc \leq Hc3$. However, as can be seen from FIG. 1b, the magnetomotive force which is more than the allowable magnetomotive force is necessary in this range. On the other hand, when the coercive force is less than the coercive force Hc1 at which the allowable magnetomotive force is satisfied, the necessary reproduction output cannot be obtained as can be seen from FIG. 1a.

In the case of the perpendicular magnetic recording medium comprising a substrate, and a recording layer which is directly formed thereon and consists of two layers having different coercive forces as disclosed in U.S. Pat. No. 4,624,894, as shown in FIG. 2a, the reproduction output decreases monotonously as the coercive force ratio Hcu/Hcl increases, in which Hcu is the coercive force of the layer on the free surface side of the recording layer, which is constant, and Hcl is the coercive force of the layer on the side of the substrate. This phenomenon may be explained as follows. In this recording medium, a substantially uniform demagnetizing field is applied to the recording medium in the perpendicular direction thereof. Therefore, the reproduction output may be expressed as the sum of the reproduction output of each layer, so that as Hcl decreases, the contribution of the lower layer to the total reproduction output of the recording medium also decreases. Furthermore, since the recording magnetomotive force of the recording medium is determined by the sum of the magnetomotive force of each layer, when Hcu/Hcl becomes large, the required magnetomotive force decreases. Therefore, for instance, when a required reproduction output is set as indicated by the broken line in FIG. 2a, and an allowable recording magneto-motive force is set as indicated by the broken line in FIG. 2b, there exits no area where both the reproduction output and the allowable magnetomotive force are satisfied.

In both of the above-mentioned conventional perpendicular magnetic recording media, when the recording magnetomotive force decreases, the reproduction output also decreases.

SUMMARY OF THE INVENTION

It is therefore an object of the present invention to provide a novel perpendicular magnetic recording medium which is capable of decreasing the recording magnetomotive force without decreasing the reproduction output thereof.

The object of this invention can be attained by a perpendicular magnetic recording medium comprising a substrate, a soft magnetic layer formed on the substrate, a lower recording layer having a coercive force of Hcl formed on the soft magnetic layer, and an upper recording layer having a coercive force of Hcu, with the ratio of Hcu/Hcl being in the range of 1.4 to 3.3, that is, $1.4 \leq Hcu/Hcl \leq 3.3$.

DETAILED DESCRIPTION OF THE PREFERRED EMBODIMENTS

Figure 3A:
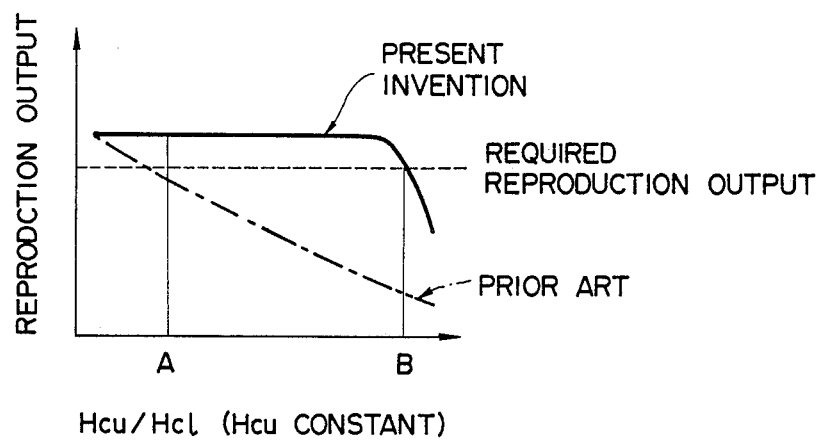
FIG. 3a shows the relationship between the Hcu/Hcl ratio and the reproduction output of a perpendicular magnetic recording medium according to the present invention.
Figure 3B:
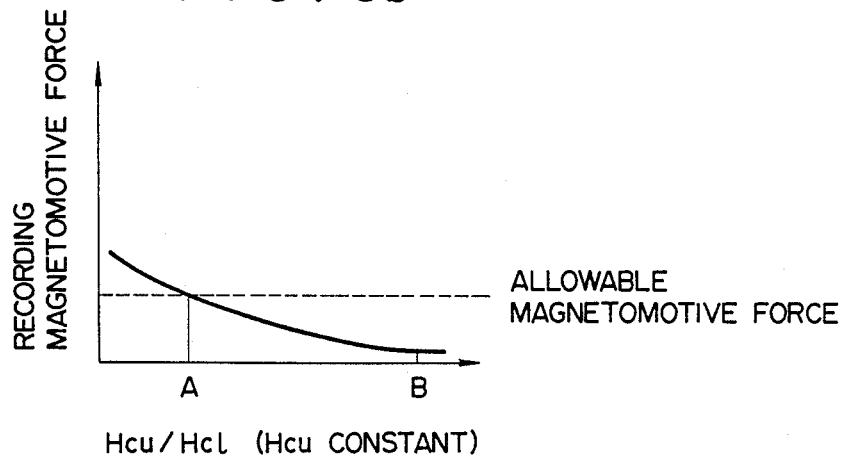
FIG. 3b shows the relationship between the Hcu/Hcl ratio and the recording magnetomotive force of the perpendicular magnetic recording medium according to the present invention in FIG. 3b.

With reference to FIGS. 3a and 3b, a perpendicular magnetic recording medium according to the present invention will now be explained in detail.

Figure 1A:
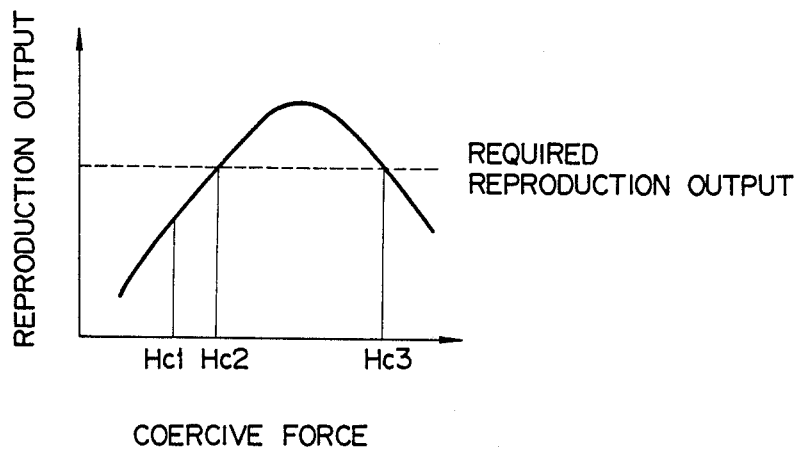
FIG. 1a shows the relationship between the coercive force and the reproduction output of a conventional perpendicular magnetic recording medium.
Figure 1B:
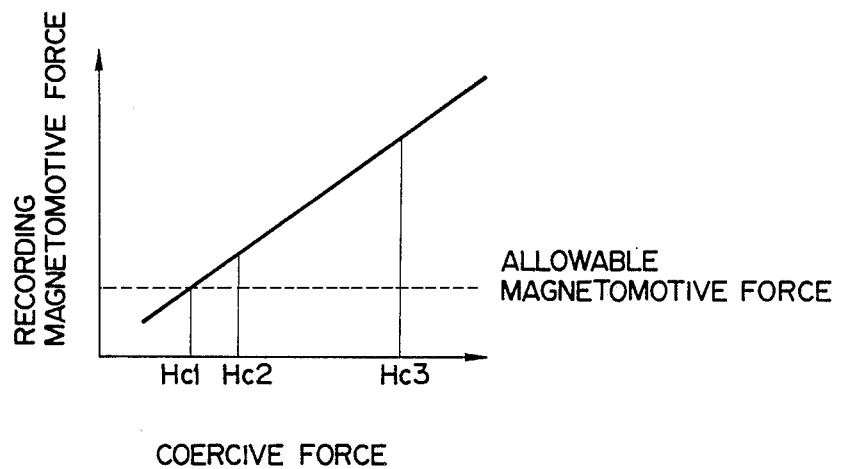
FIG. 1b shows the relationship between the coercive force and the recording magnetomotive force of the conventional perpendicular magnetic recording medium in FIG. 1b.
Figure 2A:
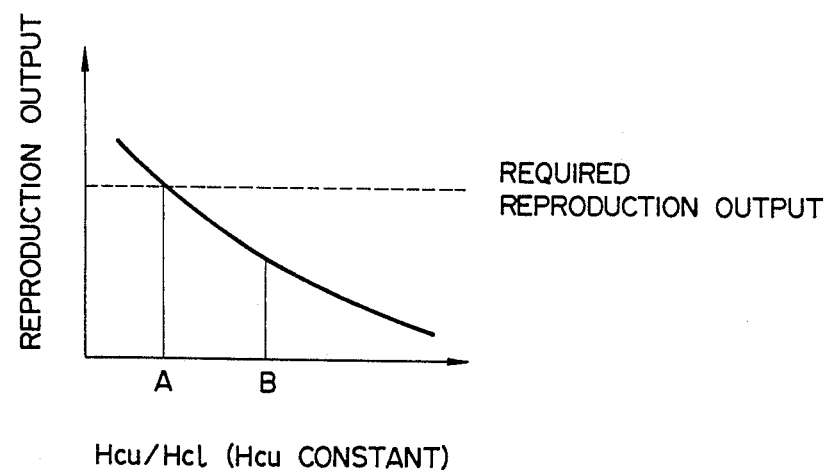
FIG. 2a shows the relationship between the Hcu/Hcl ratio and the reproduction output of another conventional perpendicular magnetic recording medium.
Figure 2B:
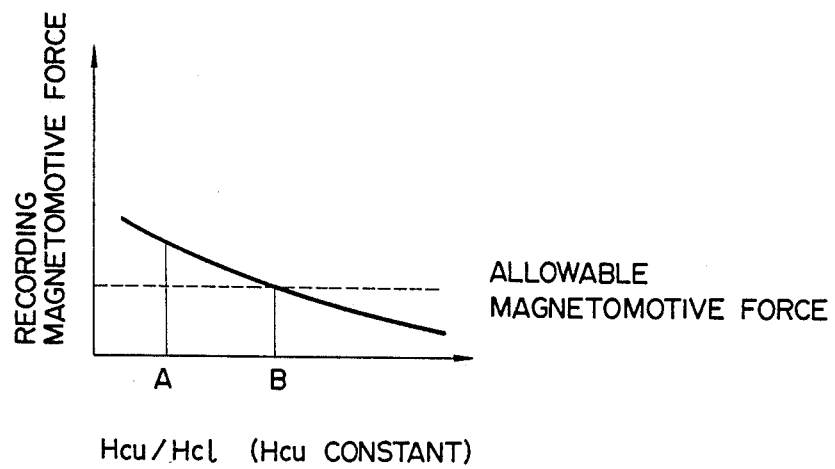
FIG. 2b shows the relationship between the Hcu/Hcl ratio and the recording magnetomotive force of the conventional perpendicular magnetic recording medium in FIG. 2b.

FIG. 3a shows the relationship between the Hcu/Hcl and the reproduction output of the perpendicular magnetic recording medium according to the present invention. In a conventional perpendicular recording medium including no soft magnetic layer, which is the same as that explained with reference to FIGS. 2a and 2b, its reproduction output decreases as the Hcu/Hcl increases as indicated by the alternate long and short dash line. By sharp contrast to this, in the perpendicular magnetic recording medium according to the present invention, its reproduction output does not decrease, but is constant in a certain range as indicated by the solid line. This phenomenon may be physically explained as follows:

In the case of the perpendicular magnetic recording medium having no soft magnetic layer, the demagnetizing field which works on the recording medium is uniform even if the recording layer consists of lower and upper layers as mentioned previously. Thus, the demagnetizing effect works on both the lower and upper layers. However, when a soft magnetic layer is provided under the recording layer, the demagnetizing field substantially works on the upper layer, but the demagnetizing field which works on the lower layer diminishes because the lower layer is in contact with the soft magnetic layer. The result is that the contribution of the lower layer to the reproduction output does not depend upon the coercive force of the recording layer. However, when the Hcl is extremely small, the perpendicular anisotropy of the recording layer itself so deteriorates that its reproduction output decreases.

On the other hand, the recording magnetomotive force of the recording medium is determined only by the coercive force of the recording layer. Therefore, when the Hcu/Hcl increases, the recording magnetomotive force decreases in the same manner as in the conventional perpendicular magnetic recording medium. Thus, the perpendicular magnetic recording medium according to the present invention is capable of realizing the satisfaction of the required reproduction output and recording magnetomotive force, for example, in a range between A and B as shown in FIGS. 3a and 3b.

In the conventional perpendicular magnetic recording medium having a soft magnetic layer, the soft magnetic layer has the function of increasing the reproduction output and recording sensitivity by decreasing the magnetic resistance of the entire magnetic circuits including a magnetic head.

As mentioned previously, the perpendicular magnetic recording medium according to the present invention comprises a substrate, a soft magnetic layer formed on the substrate, a lower recording layer having a coercive force of Hcl formed on the soft magnetic layer, and an upper recording layer having a coercive force of Hcu, with the ratio of Hcu/Hcl being in the range of 1.4 to 3.3, that is, $1.45 \leq Hcu/Hcl \leq 3.3$. Thus, in the present invention, by setting the coercive force ratio (Hcu/Hcl) of the upper layer and the lower layer of the recording layer in such a particular range, the soft magnetic layer has not only the aforementioned function of increasing the reproduction output and recording sensitivity by decreasing the magnetic resistance of the entire magnetic circuits including a magnetic head, but also the function of decreasing the demagnetizing field which works on the lower layer of the recording layer, so that it can be realized that the recording magnetomotive force can be decreased without decreasing the reproduction output. This has not been realized by the conventional perpendicular magnetic recording media.

The present invention will now be explained in more detail by referring to the following examples and comparative examples. These examples are given for illustration of the invention and are not intended to be limiting thereof.

EXAMPLES 1-1 TO 1-4

A soft magnetic layer made of Cu-Mo-Fe-Ni alloy (atomic % ratio: 5:5:15:75) with a thickness of 0.5 μm was deposited on a substrate made of a polyimide film having a thickness of about 50 μm by the RF sputtering method under the following conditions:

| | |
|---|---|
| Ar gas pressure: | 5 m Torr |
| Deposition distance from the substrate: | 70 mm |
| RF power: | 200 W |
| Temperature of the substrate: | room temperature |

The permeability of the thus formed soft magnetic layer was 200.

On the thus formed soft magnetic layer, a lower recording layer made of Co-Cr alloy with a thickness of 0.1 μm was deposited by the RF sputtering method under the following conditions:

| Ar gas pressure: | 5 m Torr |
|---|---|
| Deposition distance from the substrate: | 70 mm |
| RF power: | 200 W |
| Temperature of the substrate: | 0° C. to 250° C. |

By changing the coercive force of the lower recording layer in the above-mentioned range, four different media having a lower recording layer with a coercive force Hcl ranging from 300 Oe to 700 Oe (Examples 1-1 to 1-4) as listed in Table 1 were prepared.

On each lower recording layer, an upper recording layer consisting of a Co-Cr alloy having a thickness of 0.1 μm was deposited under the following conditions:

| Ar gas pressure: | 5 m Torr |
|---|---|
| Deposition distance from the substrate: | 70 mm |
| RF power: | 200 W |
| Temperature of the substrate: | 200° C. |

The coercive force Hcu of the thus formed upper recording medium was 1000 Oe. Thus, four perpendicular magnetic recording media of Examples 1-1 through 1-4 according to the present invention as listed in Table 1 were prepared.

COMPARATIVE EXAMPLES 1-1 to 1-5

Example 1-1 was repeated except that the coercive force Hcl was changed as given in Table 1, whereby comparative perpendicular magnetic recording media of Comparative Examples 1-1 to 1-5 were prepared.

COMPARATIVE EXAMPLES 2-1 to 2-9

Comparative Examples 1-1, Examples 1-1 to 1-4, and Comparative Examples 1-2 to 1-5 were respectively repeated except that the soft magnetic layer formed in each perpendicular magnetic recording medium was eliminated, whereby comparative perpendicular magnetic recording media of Comparative Examples 2-1 to 2-9 as given in Table 1 were prepared.

COMPARATIVE EXAMPLES 3-1 to 3-9

Comparative Examples 1-1, Examples 1-1 to 1-4, and Comparative Examples 1-2 to 1-5 were respectively repeated except that the upper recording layer provided in each example was eliminated and the thickness of the lower recording layer was increased from 0.1 μm to 0.2 μm so as to make the thickness of the recording layer the same as the total thickness of the recording layer in Examples 1-1 to 1-9, whereby comparative perpendicular magnetic recording media of Comparative Examples 3-1 to 3-9 as given in Table 1 were prepared.

The thus prepared perpendicular magnetic recording media according to the present invention and comparative perpendicular magnetic recording media were subjected to a recording and reproduction test by use of a single magnetic-pole-type head having a main magnetic pole thickness of 0.3 μm, and a track width of 50 μm, with 50 turns of coils, under the conditions that the head and each recording medium were moved relatively with a speed of 2 m/sec, with a recording density of 70 KBPI (corresponding to a recording frequency of 2.75 MHz). The results of this recording and reproduction test are shown in Table 1. In the table, ⊙ indicates that the reproduction output was 100 μV or more, and the recording magnetomotive force was 0.1 AT or less; "○" indicates that the reproduction output was 75 μV or more, and the recording magnetomotive force was 0.15 AT or less; "Δ" indicates that the reproduction output was 50 μV or more, and the recording magnetomotive force was 0.2 AT or less; and "×" indicates other than the above.

The results of this recording and reproduction test indicate that it is preferable that the coercive force ratio Hcu/Hcl be in the range of 1.4 to 3.3, that is, $1.4 \leq Hcu/Hcl \leq 3.3$, and more preferably in the range of 1.7 to 2.5, that is, $1.7 \leq Hcu/Hcl \leq 2.5$.

| Example No. | Soft Magnetic Layer | Hcl(Oe) | Hcu/Hcl | Reproduction Output (μA) | Recording Magnetomotive Force (AT) | Evaluation |
|---|---|---|---|---|---|---|
| Example 1-1 | Present | 300 | 3.3 | 92 | 0.053 | ○ |
| Example 1-2 | Present | 400 | 2.5 | 110 | 0.071 | ⊙ |
| Example 1-3 | Present | 600 | 1.7 | 113 | 0.096 | ⊙ |
| Example 1-4 | Present | 700 | 1.4 | 117 | 0.14 | ○ |
| Comparative Example 1-1 | Present | 200 | 5 | 61 | 0.042 | Δ |
| Comparative Example 1-2 | Present | 800 | 1.2 | 115 | 0.16 | Δ |
| Comparative Example 1-3 | Present | 900 | 1.1 | 115 | 0.17 | Δ |
| Comparative Example 1-4 | Present | 1000 | 1.0 | 103 | 0.19 | Δ |
| Comparative Example 1-5 | Present | 1200 | 0.83 | 85 | 0.24 | X |
| Comparative Example 2-1 | Absent | 200 | 5 | 11 | 0.15 | X |
| Comparative Example 2-2 | Absent | 300 | 3.3 | 17 | 0.19 | X |
| Comparative Example 2-3 | Absent | 400 | 2.5 | 23 | 0.29 | X |
| Comparative Example 2-4 | Absent | 600 | 1.7 | 31 | 0.36 | X |
| Comparative Example 2-5 | Absent | 700 | 1.4 | 39 | 0.47 | X |
| Comparative Example 2-6 | Absent | 800 | 1.2 | 45 | 0.58 | X |

-continued

| Example No. | Soft Magnetic Layer | Hcl(Oe) | Hcu/Hcl | Reproduction Output (μA) | Recording Magnetomotive Force (AT) | Evaluation |
| --- | --- | --- | --- | --- | --- | --- |
| Comparative Example 2-7 | Absent | 900 | 1.1 | 51 | 0.65 | X |
| Comparative Example 2-8 | Absent | 1000 | 1.0 | 55 | 0.75 | X |
| Comparative Example 2-9 | Absent | 1200 | 0.83 | 59 | 1.33 | X |
| Comparative Example 3-1 | Present | 200 | — | 23 | 0.015 | X |
| Comparative Example 3-2 | Present | 300 | — | 38 | 0.023 | X |
| Comparative Example 3-3 | Present | 400 | — | 49 | 0.056 | X |
| Comparative Example 3-4 | Present | 600 | — | 65 | 0.087 | Δ |
| Comparative Example 3-5 | Present | 700 | — | 74 | 0.12 | Δ |
| Comparative Example 3-6 | Present | 800 | — | 80 | 0.16 | Δ |
| Comparative Example 3-7 | Present | 900 | — | 94 | 0.18 | Δ |
| Comparative Example 3-8 | Present | 1000 | — | 103 | 0.19 | Δ |
| Comparative Example 3-9 | Present | 1200 | — | 92 | 0.25 | X |

What is claimed is:

1. A perpendicular magnetic recording medium comprising:
   a substrate;
   a soft magnetic layer formed on said substrate;
   a lower recording layer having a coercive force of Hcl formed on said soft magnetic layer; and
   an upper recording layer having a coercive force of Hcu, with the coercive ratio of Hcu/Hcl being in the range of 1.4 to 3.3.

2. The perpendicular magnetic recording medium as claimed in claim 1, wherein said coercive ratio of Hcu/Hcl is in the range of 1.7 to 2.5.

* * * * *